United States Patent
Besen et al.

(10) Patent No.: US 9,966,587 B2
(45) Date of Patent: May 8, 2018

(54) BATTERY FOR ROUTING SIGNALS

(71) Applicant: Apple Inc., Cupertino, CA (US)

(72) Inventors: Richard A. Besen, New York, NY (US); David A. Pakula, San Francisco, CA (US); Gregory N. Stephens, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 14/832,989

(22) Filed: Aug. 21, 2015

(65) Prior Publication Data
US 2017/0054129 A1    Feb. 23, 2017

(51) Int. Cl.
| | |
|---|---|
| *H01M 10/02* | (2006.01) |
| *H01M 2/30* | (2006.01) |
| *G06F 1/26* | (2006.01) |
| *H01M 2/10* | (2006.01) |
| *H01M 10/42* | (2006.01) |

(52) U.S. Cl.
CPC .............. *H01M 2/30* (2013.01); *G06F 1/26* (2013.01); *H01M 2/1016* (2013.01); *H01M 2/1066* (2013.01); *H01M 10/4257* (2013.01)

(58) Field of Classification Search
CPC .................................................. H01M 10/02
See application file for complete search history.

(56) References Cited

U.S. PATENT DOCUMENTS

| | | | |
|---|---|---|---|
| 2002/0044746 A1 | 4/2002 | Kronlund et al. | |
| 2011/0039137 A1 | 2/2011 | Engle et al. | |
| 2011/0318632 A1 | 12/2011 | Herrmann et al. | |
| 2014/0030584 A1 | 1/2014 | Johnson et al. | |
| 2014/0071081 A1* | 3/2014 | Shedletsky ........... | G06F 1/1643 345/174 |

OTHER PUBLICATIONS

International Search Report and Written Opinion dated May 19, 2016 in PCT/US2015/056769, 13 pages.

* cited by examiner

*Primary Examiner* — Jacob Marks
(74) *Attorney, Agent, or Firm* — Kilpatrick Townsend & Stockton, LLP (57) ABSTRACT

This application relates to batteries that are capable of routing signals that are separate from the charge supplied by the batteries. In some embodiments, a battery can incorporate a conductive trace that extends through a portion of the battery to allow for signals to be routed through the battery, as opposed to around the battery. The conductive trace can be a single wire, multiple wires, a coaxial trace, optical cable, or any other mechanism for allowing a signal to be transmitted between one or more components. By providing the conductive trace within the battery, shorter pathways to components can be created thereby reducing signal or power loss over the pathways.

13 Claims, 10 Drawing Sheets

BATTERY FOR ROUTING SIGNALS

FIELD

The present disclosure relates generally to batteries. More specifically, the present embodiments relate to batteries that are capable of providing power to a device while simultaneously routing signals between components of the device.

BACKGROUND

Devices have become more compact in reason times, while also incorporating more functionality. However, with more functionality often comes the introduction of more components into a device. Because there is limited space within a device, designers of devices are often tasked with effectively organizing components within a device to make the most of the limited space. Inevitably, certain components such as a battery occupy substantial amounts of space within certain devices thereby eliminating potential wiring routes at the location of the battery.

SUMMARY

This paper describes various embodiments that relate to batteries that are configured to route signals through the battery. In some embodiments, a portable charge storage device is set forth. The portable charge storage device can include a charge storage medium, and a terminal coupled to the charge storage medium. The terminal can be configured to relay a charge between the charge storage medium and an external circuit. The portable charge storage device can further include a conductive element (e.g., a conductive trace, a wire, a cable, a coaxial cable, coaxial trace, optical wire) that is electrically isolated from the charge storage medium and arranged to carry a signal through the portable storage device.

In some embodiments, a battery is set forth. The battery can include a power terminal configured to provide a charge that is stored by the battery, and a conductive trace that is electrically isolated from the power terminal. The battery can further include a battery housing having at least two layers that form a fold at an edge of the battery, and the conductive trace can at least partially reside in the fold. Furthermore, the conductive trace can be electrically isolated from an anode and a cathode layer of the battery.

In other embodiments, a computing device is set forth. The computing device can include at least two electrical components and a battery. The battery can include a set of power terminals configured to provide power to the computing device. Additionally, the battery can include a conductive trace that is electrically disconnected from the set of power terminals and configured to provide a conductive pathway between the at least two electrical components. The battery can further include a battery housing that envelopes an anode layer and a cathode layer. The conductive trace can be at least partially disposed within the battery housing and be electrically isolated from the anode layer and the cathode layer.

In yet other embodiments, a method of forming a battery is set forth. The method can include a step of disposing an anode layer and a cathode layer between a battery housing of a battery. The method can further include a step of configuring the battery housing around a conductive trace such that the conductive trace is electrically isolated from the anode layer and the cathode layer. The method can also include steps of connecting a supply terminal to at least one of the anode layer and the cathode layer, and connecting a routing terminal to the conductive trace. The routing terminal and the supply terminal can be located on different surfaces of the battery.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings.

DETAILED DESCRIPTION

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Managing space for connecting components within a computing device has become a growing challenge as many computing devices have become more compact over time. In some devices, certain components such as batteries create barriers that force certain connections to be routed around the batteries. Unfortunately, increasing the length of a connection increases the resistance of the connection, which in turn promotes power and signal loss across the connection. This is especially problematic for mobile computing devices, which may already have issues reserving power over extended periods of time. The embodiments provided herein are set forth to improve the routing of connections within a device by using a battery to connect components.

In some embodiments, a battery is set forth for providing power to a device while simultaneously routing signals between components of the device. The battery can include power terminals for connecting the battery to a component for supplying power from the battery to the component. The battery can also include one or more conductive traces or wires for routing electrical signals between components of the device. The conductive trace can be incorporated into one or more surfaces of the battery. For example, the conductive trace can extend through one or more edges of the battery, or through a top or bottom surface that is surrounded by the edges. Furthermore, the terminations of the conductive trace can be on different edges or different surfaces of the battery.

During manufacturing of the battery, at least two layers of the battery housing can be disposed around one or more anode and cathode layers. The conductive trace can be incorporated between the two layers of the battery housing and electrically isolated from the anode and cathode layers. A separation layer can be incorporated to help electrically isolate the conductive trace from the anode and cathode layers. A dielectric layer can be formed around the conductive trace in order to create a coaxial trace using the battery housing, the dielectric layer, and the conductive trace. In this way, electromagnetic interference can be reduced when routing alternating current signals through the conductive trace of the battery. This can be useful when using the conductive trace to route antenna signals between two locations on the device. In some embodiments, the conductive trace can be connected to an I/O port, audio jack, display device, acoustic device, antenna, motor, light, button, switch, processor, power management unit, or any other component in a device suitable for sending or receiving power or electrical signals.

These and other embodiments are discussed below with reference to FIGS. 1-10; however, those skilled in the art will readily appreciate that the detailed description given herein with respect to these figures is for explanatory purposes only and should not be construed as limiting.

Figure 1:
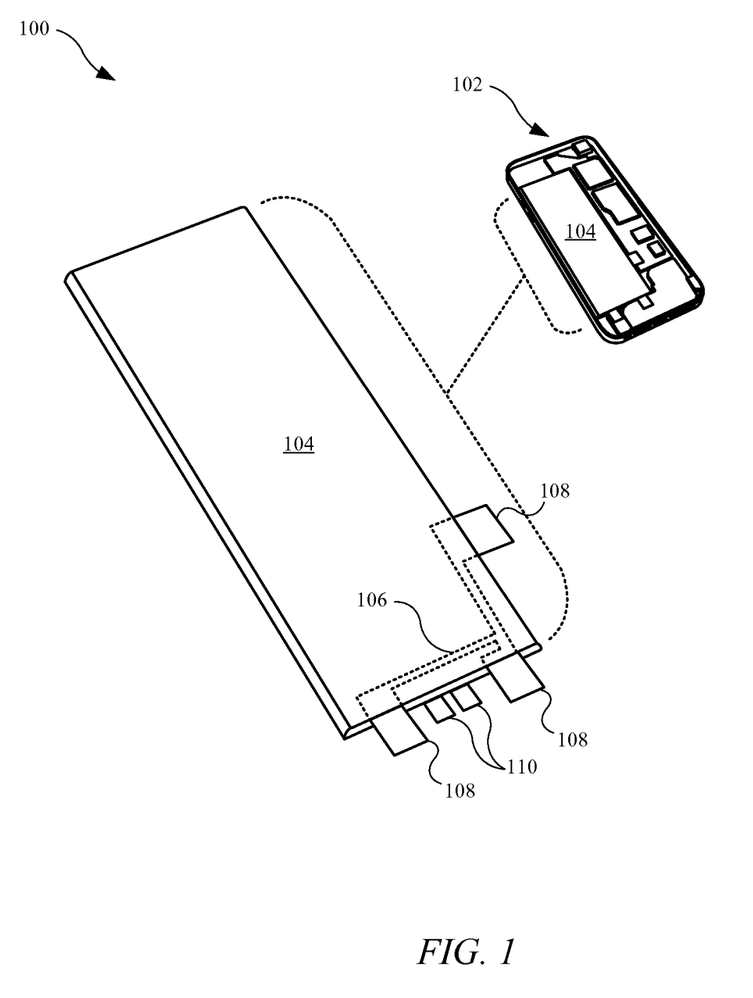
FIG. 1 illustrates a perspective view of a computing device and a battery, according to some embodiments discussed herein.

FIG. 1 illustrates a perspective view 100 of a computing device 102 and a battery 104, according to some embodiments discussed herein. The computing device 102 can be a mobile phone, media player, laptop, tablet, watch, desktop computer, or any other device suitable for being powered by a battery. The battery 104 can include at least one pair of power terminals 110 that can provide power to the computing device 102 from the battery 104 via the power terminals. The battery 104 can further include multiple electrical contacts 108. Each electrical contact 108 can be connected to each other through a conductive trace 106 that is disposed within a housing of the battery 104. By incorporating the conductive trace 106 within the battery housing, more space can be created for other connections inside the computing device 102. The conductive trace 106 can be a single connection or a cable that routes multiple connections. For example, each electrical contact 108 can be connected to one or more components of the computing device 102 such that each component can transmit signals to each other through the conductive trace. In some embodiments, an electrical contact 108 can be connected to a component that is also connected to the power terminals 110. In this way, signals for controlling the component can be routed through the conductive trace 106, while the power for the component can be provided through the power terminals 110. It should be noted that any suitable number of conductive traces 106 and electrical contacts 108 can be incorporated into the battery 104. Furthermore, in computing devices 102 having more than one battery 104, a conductive trace of each battery can be connected together in order to route one or more signals through multiple batteries. Additionally, although FIG. 1 illustrates some of the electrical contacts 108 being cater-corner from each other on the battery 104, the electrical contacts 108 and conductive trace 106 can be arranged in any suitable orientation for providing signals routes for different components. Furthermore, the conductive trace 106 can be disposed above, below, or in between anode and cathode layers of the battery 104, as further discussed herein.

Figure 2A:
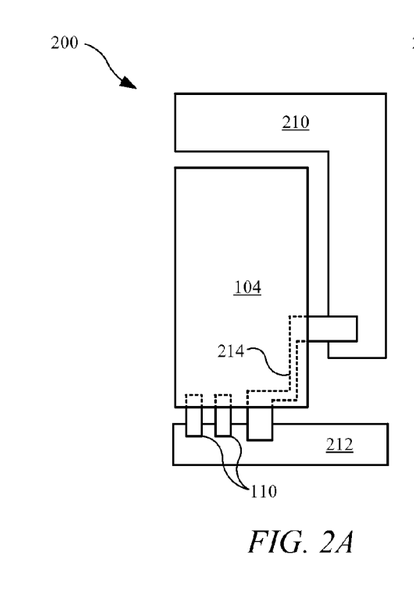
FIGS. 2A-2D illustrate various embodiments of a battery having one or more conductive traces and power terminals that are electrically isolated from the conductive traces in the battery.
Figure 2B:
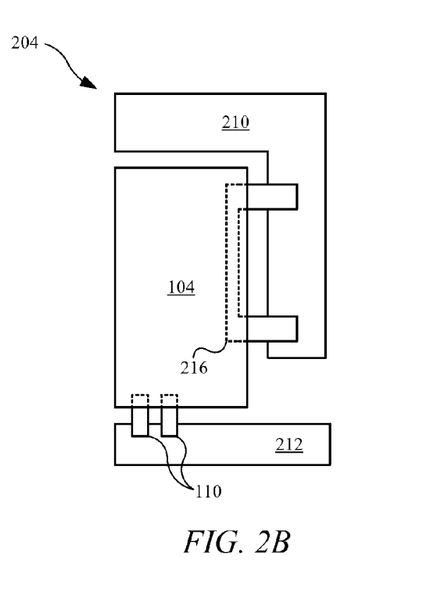

FIGS. 2A-2D illustrate various embodiments of a battery having one or more conductive traces and power terminals 110 that are electrically isolated from the conductive traces in the battery. FIG. 2A illustrates a circuit 200 having a logic board 210 that is connected to a component 212 via a conductive trace 214 that is located within a housing of the battery 104. The component 212 is also connected to power terminals 110 of the battery 104 in order to receive a current or voltage from the battery 104. The conductive trace 214 extends from the battery 104 at two different edges that are cater-corner from each other. This configuration is beneficial because the conductive trace 214 does not have to go above or below the battery 104 and/or the component 212. FIG. 2B illustrates a circuit 204 that includes some of the same elements of FIG. 2A except that the conductive trace 214 does not extend from the battery at two different edges, but rather the conductive trace 214 extends from the battery at the same edge. In this way, connections on the logic board 210 can leave the logic board 210 and return to the logic board 210 without having to substantially overlap the logic board 210. This provides more room for other components on the logic board 210 because less space is occupied by the conductive trace 214.

Figure 2C:
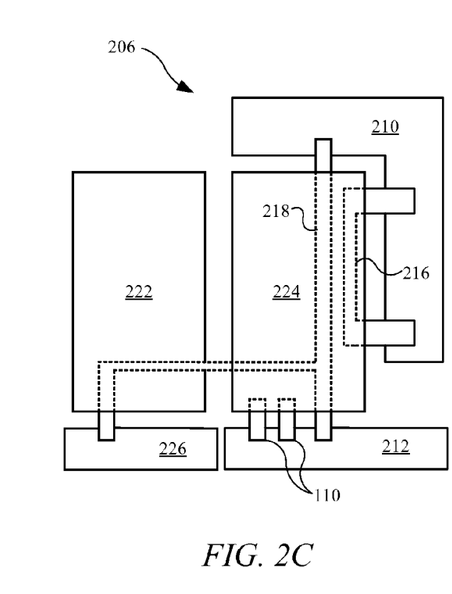
Figure 2D:
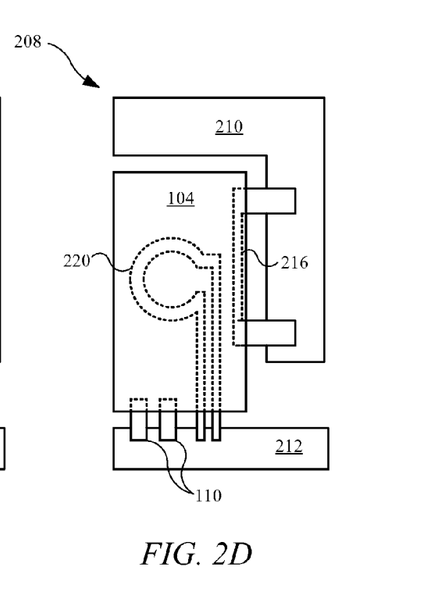

FIG. 2C illustrates a circuit 206 that includes a first battery 222 and a second battery 224 that each include an interconnected conductive trace 218 that extends between the first battery 222 and the second battery 224. By incorporating the interconnected conductive trace 218, the logic board 210 can be connected to the component 212 and a component 226 through the first battery 222 and the second battery 224. The interconnected conductive trace 218 can be a single wire segment or a cable having multiple wires to deliver one or more signals between the logic board 210 and the component 226 and/or the component 212. The conductive trace 216 can also be incorporated into the first battery 222 or the second battery 224, as illustrated in the circuit 206, in order to provide additional signal routing for the logic board 210. FIG. 2D illustrates a circuit 208 with a battery 104 having a coil 220 for receiving wireless signals or wireless power. In this way, the coil 220 can act as an antenna for communicating wirelessly with a component within the device in which the circuit 208 is incorporated, or with another device external to the device in which the circuit 208 is incorporated. In some embodiments, the coil 220 acts to send or receive wireless power. The component 212 can be configured to control the resonance of the coil 220 to accept wireless power from another device. Upon receiving the wireless power, the coil 220 can transfer the power to the component 212, which in turn can charge the battery 104. When the battery 104 is fully charged, the component 212 can disconnect from the coil 220 to stop the wireless power from being received. In some embodiments, the device incorporating the circuit 208 can be powered exclusively from wireless power received at the coil 220. Additionally, the device incorporating the circuit 208 can be simultaneously be powered by the battery 104 and wireless power received at the coil 220.

Figure 3A:
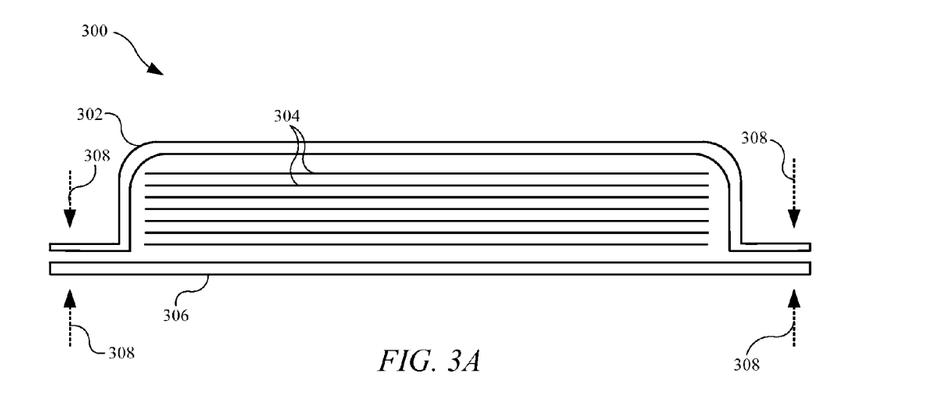
FIGS. 3A and 3B illustrate steps for forming a battery according to some embodiments discussed herein.
Figure 3B:
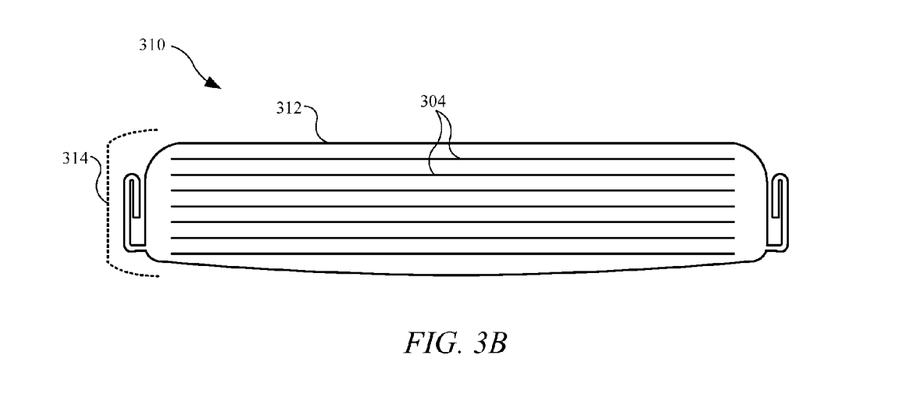

FIGS. 3A and 3B illustrate steps for forming a battery according to some embodiments discussed herein. The steps can be performed by a person or a manufacturing device that is controlled by a computer. FIG. 3A illustrates a cross sectional view 300 of a battery during manufacturing of the battery. A combination of anode and cathode layers 304 are provided for storing charge. The anode and cathode layers 304 are wrapped or enveloped by a first layer 302 and a second layer 306, which can each be made of any suitable material for forming a battery housing. A pressing force 308 is applied to the edges of the first layer 302 and the second layer 306 in order to bind the first layer 302 and the second layer 306 to create a battery housing 312, shown in FIG. 3B. Thereafter, the edges of the first layer 302 and the second layer 306 are folded, as shown in FIG. 3B. Specifically, FIG. 3B illustrates a cross sectional view 310 of a battery 314 that has been formed as a result of enclosing the anode and cathode layers 304 in a battery housing 312. The steps illustrated in FIGS. 3A and 3B can be modified to incorporate conductive pathways through the battery 314, as discussed herein.

Figure 4A:
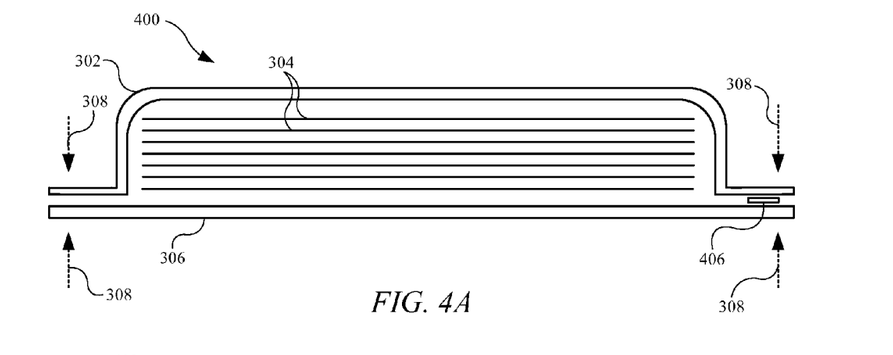
FIGS. 4A-4E illustrate cross sections of batteries that include a conductive pathway through the batteries.
Figure 4B:
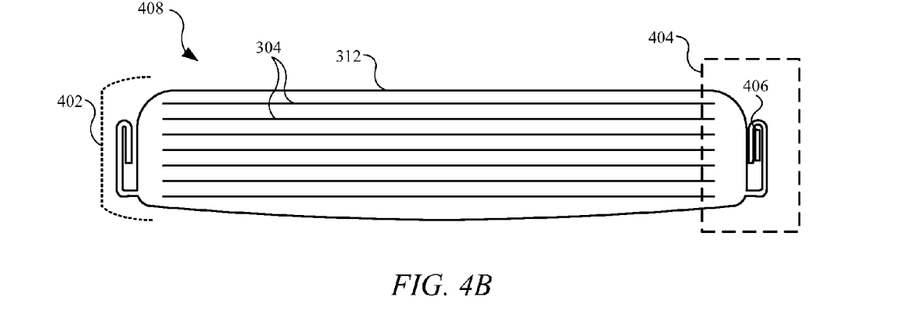

FIGS. 4A-4E illustrate cross sections of batteries that include a conductive pathway through the batteries. FIG. 4A illustrates a cross sectional view 400 of a battery being formed with a conductive trace 406. The conductive trace 406 can be disposed between a first layer 302 and a second layer 306 when the battery housing 312 is being formed around the anode and cathode layers 304 of the battery 402. A pressing force 308 is applied to the first layer 302 and the second layer 306 in order to seal the conductive trace 406 into the battery 402. FIG. 4B illustrates a cross sectional view 408 of the battery 402 formed with the conductive trace 406 within an edge 404 of the battery 402. In this way, the battery 402 can be used to relay signals between one or more components of a device in which the battery 402 is incorporated, while also providing power to the device. It should be noted that the conductive trace 406 can be electrically isolated from any power terminals, anode layers, and/or cathode layers, such that the battery 402 can concurrently provide power and relay signals in a device. Additionally, the conductive trace 406 can be a single wire or a cable having multiple wires for routing multiple signals through the conductive trace 406.

Figure 4C:
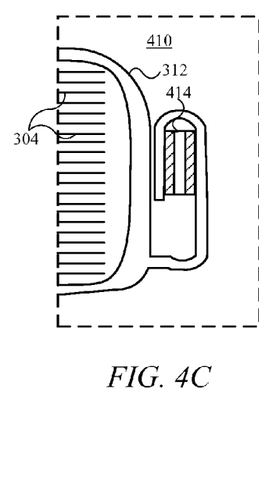
Figure 4D:
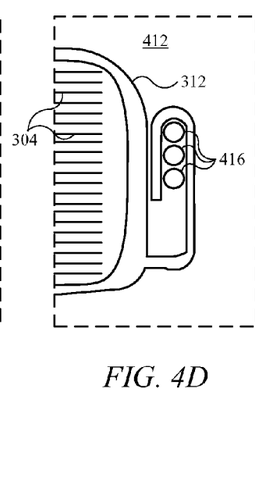
Figure 4E:
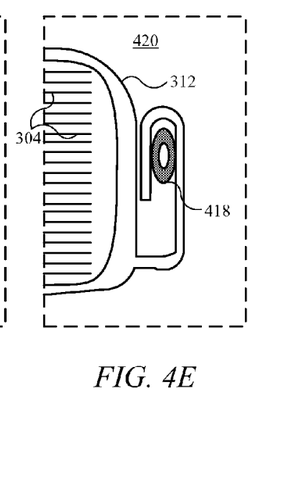

FIGS. 4C-4E illustrate different types of components that can be incorporated into the battery 402 according to embodiments discussed herein. Specifically, FIG. 4C illustrates a cross section 410 of an edge of a battery incorporating a capacitive element 414 in the edge of the battery. The capacitive element 414 can be used for any purpose suitable for employing a capacitive element. For example, the capacitive element 414 can be used as a sensor for detecting movement inside or outside a device incorporating the battery 402. In this way, the weight of the battery 402 can be leveraged for making the sensor more or less sensitive. FIG. 4D illustrates a cross section 412 of an edge of the battery 402 incorporating multiple cables 416 in the edge of the battery 402. The cables can be electrical or optical cables for transmitting electrical or optical signals, respectively. FIG. 4E illustrates a cross section 420 of an edge of a battery incorporating a coaxial trace 418 in the edge of the battery. The coaxial trace 418 can include a conductive layer and a dielectric layer surrounding the conductive layer. Additionally, the battery housing 312 can act as a ground layer and/or an electromagnetic shielding layer. In this way, signals that have a frequency that may be subject to electromagnetic interference can be routed through the battery, and specifically through the coaxial trace 418.

Figure 5A:
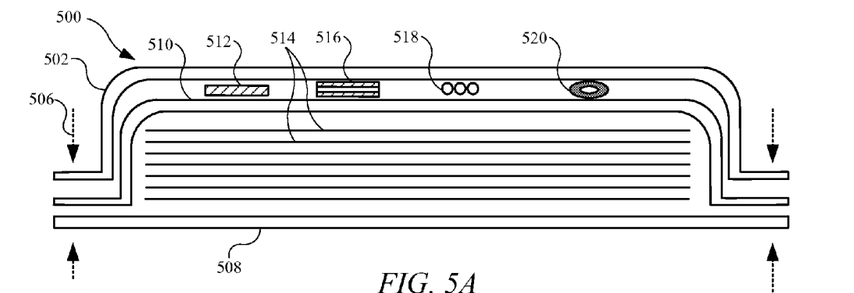
FIGS. 5A-5D illustrates embodiments of a battery incorporating one or more components above or below the anode and cathode layers of the battery.
Figure 5B:
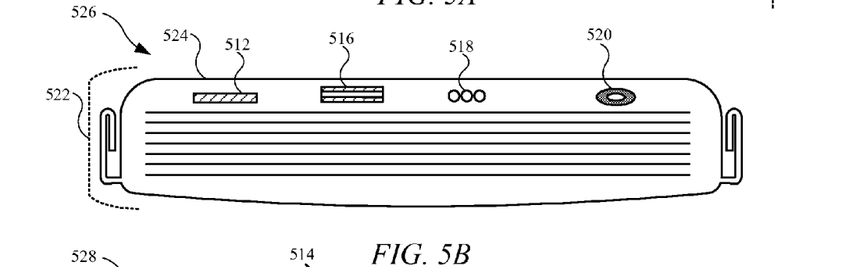

FIGS. 5A-5D illustrates embodiments of a battery incorporating one or more components above or below anode and cathode layers 514 of the battery. Specifically, FIG. 5A illustrates a cross sectional view 500 of a battery 522 being formed with one or more components above the anode and cathode layers 514 of the battery 522. The components formed in the battery 522 can include a single conductive trace 512, a capacitive element 516, multiple wires 518, and/or a coaxial trace 520, as discussed herein. One or more of the aforementioned components can be disposed between a first layer 502 and a second layer 510 of a battery housing 524. The first layer 502, the second layer 510, and a third layer 508 can be pressed together with a pressing force 506 in order to create the battery housing 524 around the anode and cathode layers 514. FIG. 5B illustrates a cross sectional view 526 of the battery 522 having one or more conductive elements above the anode and cathode layers 514. In this way, the area above the anode and cathode layers 514 can be used to route signals or perform other circuit related functions.

Figure 5C:
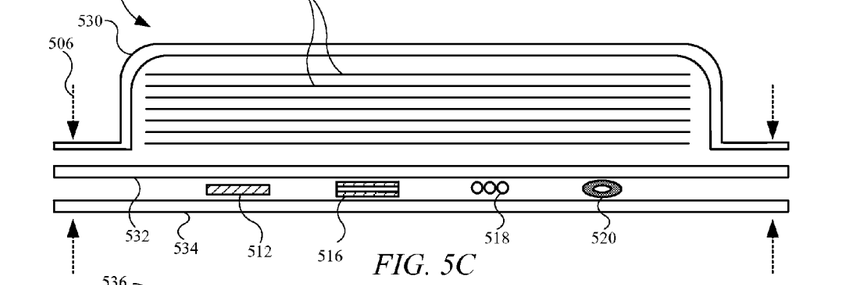
Figure 5D:
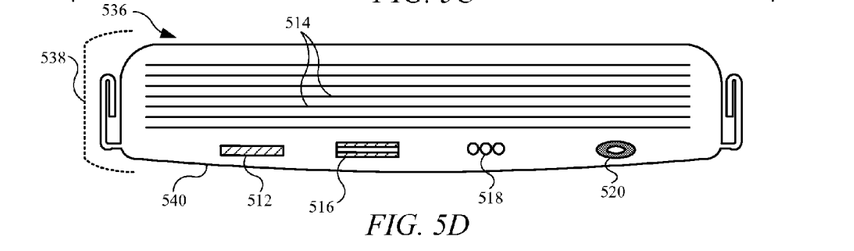

FIG. 5C illustrates a cross sectional view 528 of a battery 538 incorporating one or more components below the anode and cathode layers 514 of the battery 538. The components formed in the battery 538 can include a single conductive trace 512, a capacitive element 516, multiple wires 518, and/or a coaxial trace 520, as discussed herein. One or more of the aforementioned components can be disposed between a second layer 532 and a third layer 534 of a battery housing 540. The first layer 530, the second layer 532, and the third layer 534 can be pressed together with a pressing force 506 in order to create the battery housing 540 around the anode and cathode layers 514. FIG. 5D illustrates a cross sectional view 536 of the battery 538 having one or more conductive elements below the anode and cathode layers 514. In this way, the area below the anode and cathode layers 514 can be used to route signals or perform other circuit related functions for a device in which the battery 538 can be incorporated. It should be noted that any of the embodiments discussed herein can be combined in any suitable way to incorporate electrical components within a battery. For example, in some embodiments, components can be incorporated in one or more edges of a battery, as well as above and/or below the anode and cathode layers of the battery.

Figure 6A:
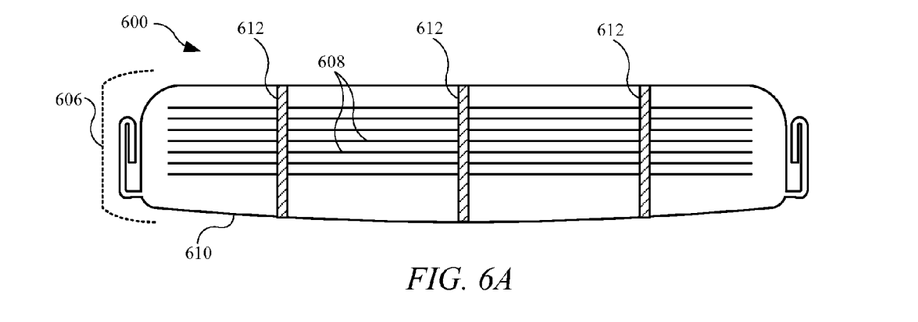
FIGS. 6A-6C illustrate embodiments of a battery incorporating a conductive trace that allows for routing signals between different portions of the battery.
Figure 6B:
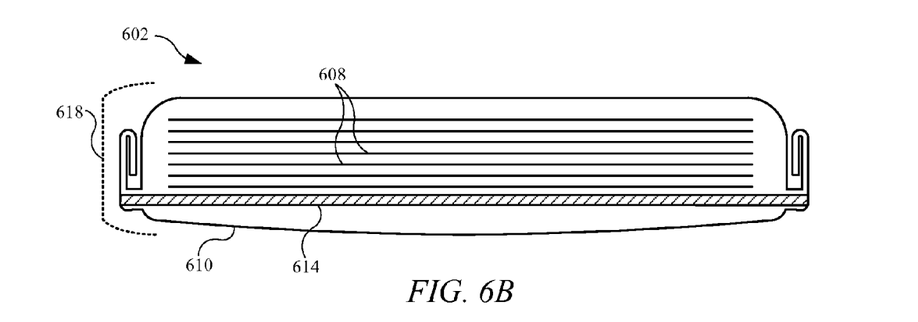
Figure 6C:
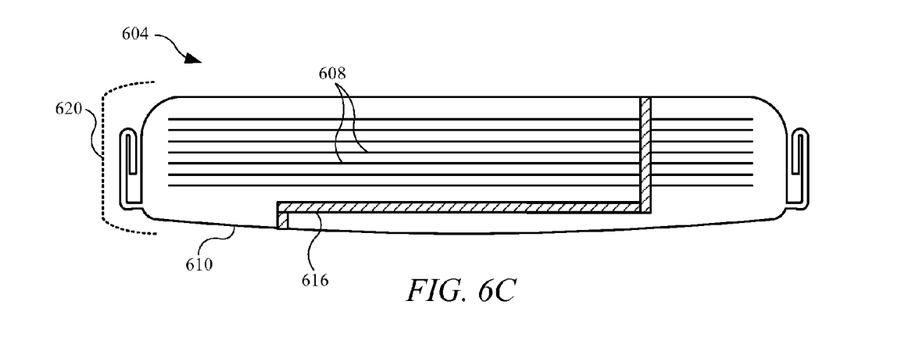

FIGS. 6A-6C illustrate embodiments of a battery incorporating a conductive trace that allows for routing signals between different portions of the battery. Specifically, FIG. 6A illustrates a cross-sectional view 600 of a battery 606 incorporating one or more conductive traces 612 extending through different regions of the battery 606. Each conductive trace 612 can extend from a bottom of the battery 606, through the anode and cathode layers 608, to a top of the battery 606. In this way, a component can be connected to a different component through a conductive trace 612 that extends from the top to the bottom of the battery 606. The conductive trace 612 can extend through the anode and cathode layers 608 and be electrically isolated from anode and cathode layers 608 using a non-conductive layer surrounding the conductive trace 612. It should be noted that the term electrically isolated, as used herein, can refer to the plane meaning of electrically isolated, or refer to the property of a component having a conductive pathway that is not shared with another component. For example, each battery discussed herein can include power terminals that are connected to anode and cathode layers, respectively, and the power terminals can have different conductive pathways than a conductive trace (at least within the battery).

FIG. 6B illustrates a cross-sectional view 602 of a battery 618 incorporating a conductive trace 614 that extends from one edge of the battery 618 to another edge of the battery 618. In this way, different components or circuits can be connected to each other through the conductive trace. This provides the benefit of providing more space outside of the battery 618 because the connection between the different components does not have to be routed above or below the battery 618. FIG. 6C illustrates a cross-sectional view 604 of a battery 620 incorporating a conductive trace 616 that extends from one side of the battery 620 to a different side of the battery 620, and from the bottom of the battery 620 to the top of the battery 620. It should be noted that any suitable routing of the conductive trace 616 can be used to route signals through the battery 620.

Figure 7A:
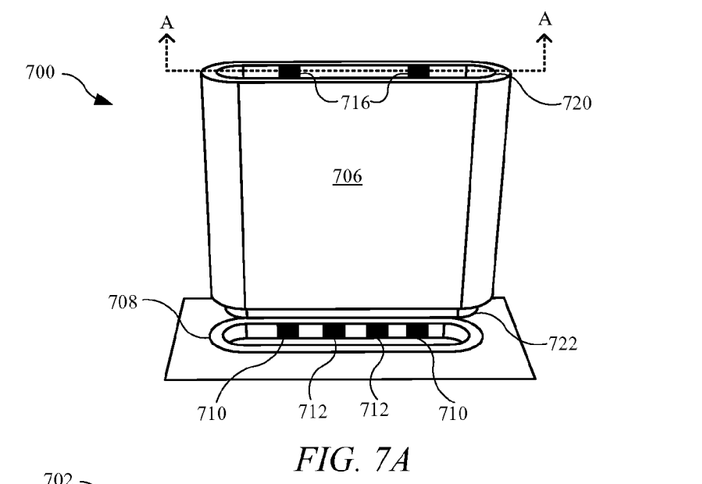
FIGS. 7A-7C illustrates an embodiment of an adapter that includes a battery and can route signals from one device through the battery to another device.
Figure 7B:
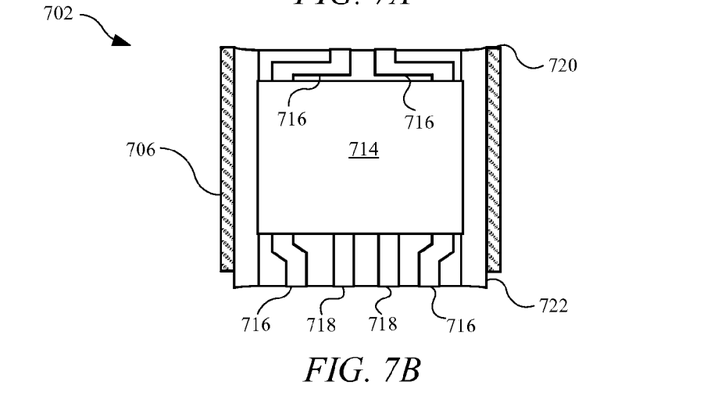
Figure 7C:
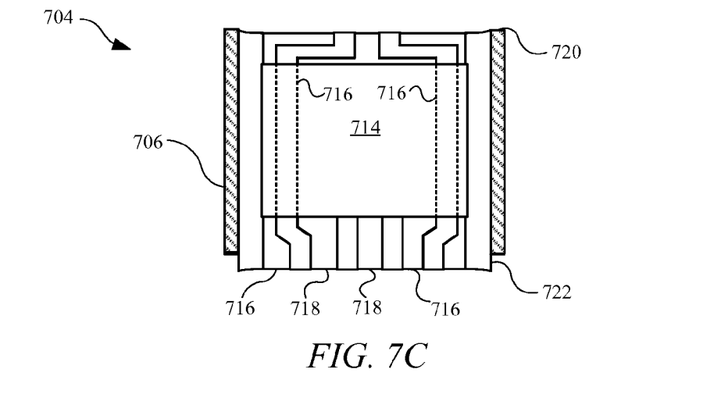

FIGS. 7A-7C illustrates an embodiment of an adapter that includes a battery and can route signals from one device through the battery to another device. Specifically, FIG. 7A illustrates a perspective view 700 of an adapter 706 that includes a plug 722 and a port 720. The plug 722 can be connected to a device port 708 for routing power to or from the device port 708. Additionally, the plug 722 can route signals or data to or from the device port 708. The device port 708 can include power terminals 712 and data terminals 710. The data terminals 710 can output a data signal that can route through a battery of the adapter 706 to data lines 716 at the port 720. In this way, the adapter 706 can simultaneously provide power while also routing signals to an external device that can be connected to the port 720. The port can include any number of data lines 716 and be sized to fit any plug of a device that is suitable for receiving data from another device. FIG. 7B illustrates a cross-sectional view 702 of cross-section A, illustrated in FIG. 7A. Specifically, FIG. 7B illustrates a battery 714 that can be incorporated into the adapter 706. The battery 714 can be connected to supply terminals 718 that can route power to a device that is connected to the port 720. Additionally, the data lines 716 can route signals between the plug 722 and the port 720. FIG. 7C illustrates a cross-sectional view 702 of cross-section A, illustrated in FIG. 7A, with hidden lines illustrating how the data lines 716 traverse the battery 714. It should be noted that the data lines 716 can be incorporated into the battery 714 according to any embodiments discussed herein. Furthermore, the data lines 716 can represent conductive traces, wires, cables, coaxial traces, coaxial cables, optical wires, or any other medium for relaying data.

Figure 8:
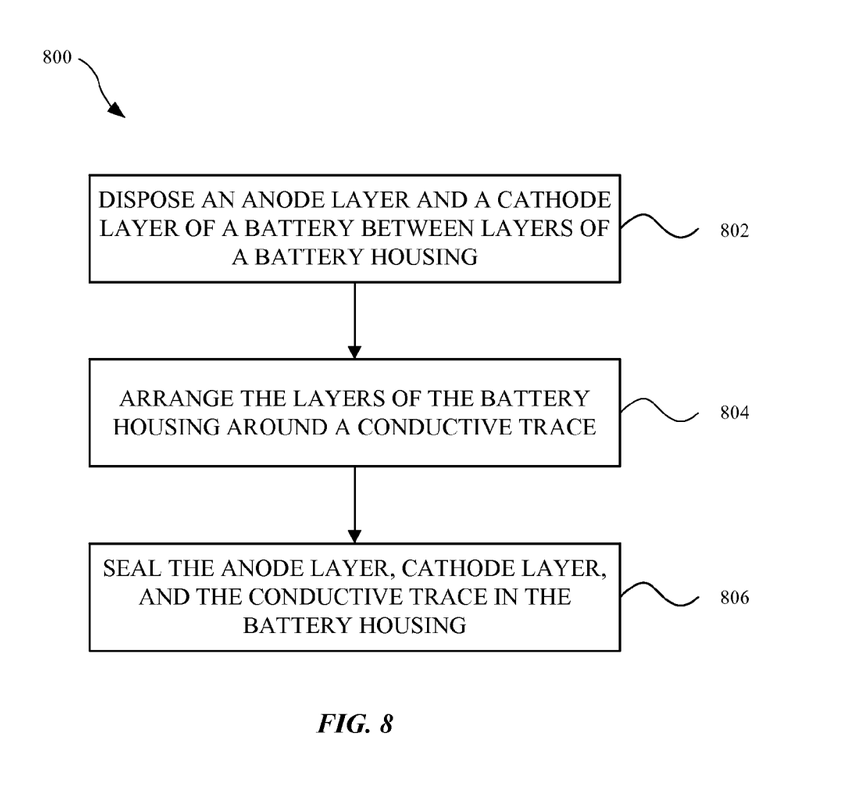
FIG. 8 illustrates a method for forming a battery that includes a conductive trace that is electrically isolated from a set of power terminals of the battery.

FIG. 8 illustrates a method 800 for forming a battery that includes a conductive trace that is electrically isolated from a set of power terminals of the battery. The method 800 can be performed by a computing device or other device suitable for manufacturing a battery. The method 800 can include a step 802 of disposing an anode and a cathode layer between layers of a battery housing. At step 804, the layers of the battery housing are arranged around a conductive trace. At step 806, the anode layer, cathode layer, and the conductive trace are sealed within, or at least partially within the battery housing to form the battery.

Figure 9:
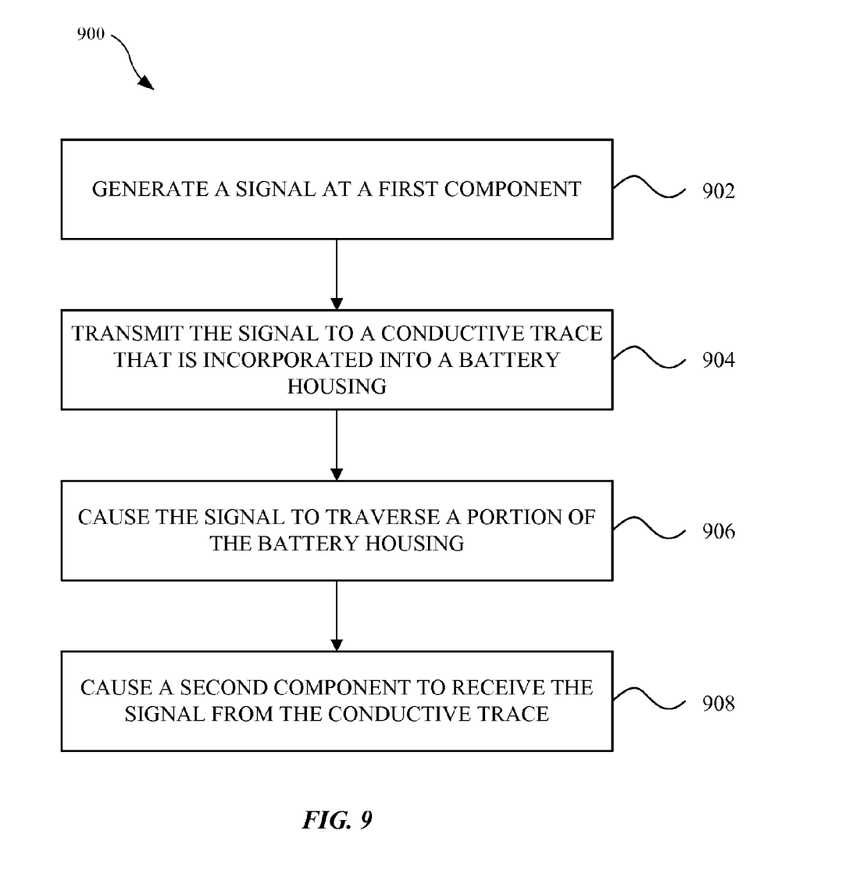
FIG. 9 illustrates a method of transmitting a signal through a conductive trace that is disposed within a battery and is electrically isolated from a set of power terminals of the battery.

FIG. 9 illustrates a method 900 of transmitting a signal through a conductive trace that is disposed within a battery and is electrically isolated from a set of power terminals of the battery. The method 900 can be performed by any component suitable for sending electrical or optical signals. The method 900 can include a step 902 of generating a signal at a first component. The first component can be any electrical or optical component not limited to a transmitter, receiver, processor, sensor, circuit component, wire, or any other suitable component. At step 904, the signal is transmitted to a conductive trace that is incorporated into a battery housing. The conductive trace can be any electrically conductive pathway or optical pathway for sending signals. At step 906, the signal is caused to traverse a portion of the battery housing. At step 908, a second component is caused to receive the signal from the conductive trace.

Figure 10:
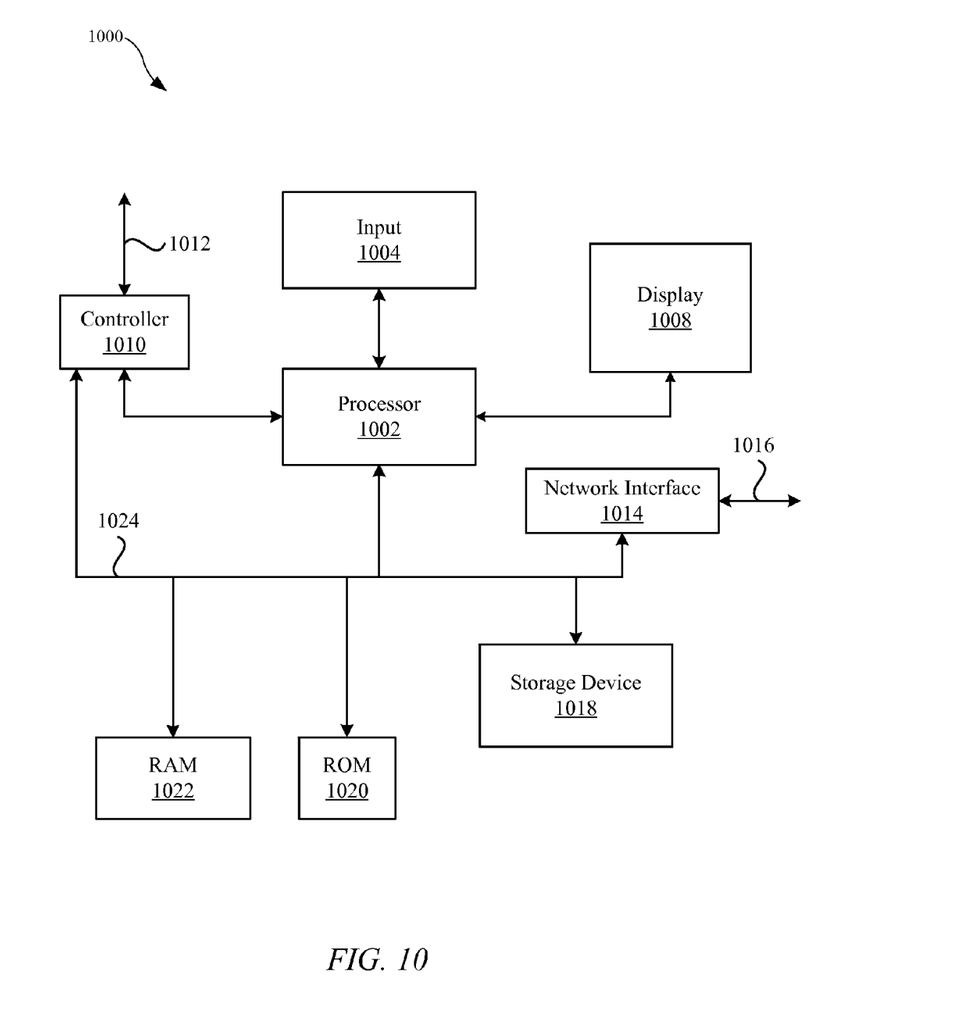
FIG. 10 is a block diagram of a computing device that can represent the components of a device incorporating any of the battery embodiments discussed herein, and/or a manufacturing device suitable for manufacturing any of the battery embodiments discussed herein.

FIG. 10 is a block diagram of a computing device 1000 that can represent the components of the computing device 102, a device incorporating any of the battery embodiments discussed herein, and/or a manufacturing device suitable for manufacturing any of the battery embodiments discussed herein. It will be appreciated that the components, devices or elements illustrated in and described with respect to FIG. 10 may not be mandatory and thus some may be omitted in certain embodiments. The computing device 1000 can include a processor 1002 that represents a microprocessor, a coprocessor, circuitry and/or a controller for controlling the overall operation of computing device 1000. Although illustrated as a single processor, it can be appreciated that the processor 1002 can include a plurality of processors. The plurality of processors can be in operative communication with each other and can be collectively configured to perform one or more functionalities of the computing device 1000 as described herein. In some embodiments, the processor 1002 can be configured to execute instructions that can be stored at the computing device 1000 and/or that can be otherwise accessible to the processor 1002. As such, whether configured by hardware or by a combination of hardware and software, the processor 1002 can be capable of performing operations and actions in accordance with embodiments described herein.

The computing device 1000 can also include user input device 1004 that allows a user of the computing device 1000 to interact with the computing device 1000. For example, user input device 1004 can take a variety of forms, such as a button, keypad, dial, touch screen, audio input interface, visual/image capture input interface, input in the form of sensor data, etc. Still further, the computing device 1000 can include a display 1008 (screen display) that can be controlled by processor 1002 to display information to a user. Controller 1010 can be used to interface with and control different equipment through equipment control bus 1012. The computing device 1000 can also include a network/bus interface 1014 that couples to data link 1016. Data link 1016 can allow the computing device 1000 to couple to a host computer or to accessory devices. The data link 1016 can be provided over a wired connection or a wireless connection. In the case of a wireless connection, network/bus interface 1014 can include a wireless transceiver.

The computing device 1000 can also include a storage device 1018, which can have a single disk or a plurality of disks (e.g., hard drives) and a storage management module that manages one or more partitions (also referred to herein as "logical volumes") within the storage device 1018. In some embodiments, the storage device 1018 can include flash memory, semiconductor (solid state) memory or the like. Still further, the computing device 1000 can include Read-Only Memory (ROM) 1020 and Random Access Memory (RAM) 1022. The ROM 1020 can store programs, code, instructions, utilities or processes to be executed in a non-volatile manner. The RAM 1022 can provide volatile data storage, and store instructions related to components of the storage management module that are configured to carry out the various techniques described herein. The computing device 1000 can further include data bus 1024. Data bus 1024 can facilitate data and signal transfer between at least processor 1002, controller 1010, network/bus interface 1014, storage device 1018, ROM 1020, and RAM 1022.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable charge storage device comprising:
   a housing;
   a charge storage medium arranged to store electrical energy in the form of stored charge and carried by the housing;
   a terminal embedded within the housing and coupled to the charge storage medium and configured to facilitate passage of an amount of electrical energy stored within the charge storage medium between the charge storage medium and an external circuit coupled to the terminal; and
   a conductive element that is electrically isolated from the charge storage medium and the terminal and arranged to carry an information signal through the housing to and/or from the external circuit.

2. The portable charge storage device of claim 1, wherein at least a portion of the conductive element resides in a fold at an edge of the charge storage medium.

3. The portable charge storage device of claim 2, wherein the conductive element includes terminals that are cater-corner from each other on a housing of the charge storage medium.

4. The portable charge storage device of claim 1, wherein the conductive element is electrically isolated from an anode and a cathode layer of the charge storage medium.

5. The portable charge storage device of claim 1, wherein the conductive element includes a data terminal that is located on a first surface of the charge storage medium that is different than a second surface on which the terminal is located.

6. The portable charge storage device of claim 1, wherein the conductive element is a coaxial element that includes a dielectric layer.

7. The portable charge storage device of claim 1, wherein the conductive element is configured to provide a conductive pathway between each electrical contact of the conductive element without supplying charge from the charge storage medium to each electrical contact.

8. A computing device comprising:
   at least two electrical components at least one of which comprises logic circuitry; and
   a battery comprising a battery housing and a power cell carried by the battery housing and arranged to store power in a charge storage medium and:
   (i) power terminals carried by and partially embedded within the battery housing and accessible by at least one of the at least two electrical components and configured to route power from the power cell to at least one of the at least two electrical components; and
   (ii) a conductive trace carried within battery housing that is electrically isolated from the power terminals and configured to provide a communication path between the at least two electrical components.

9. The computing device of claim 8, wherein the at least two electrical components correspond to a first component that carries the logic circuitry on a logic board and a second component separate and distinct from the logic board.

10. The computing device of claim 8, wherein the battery housing carries
    an anode layer and a cathode layer.

11. The computing device of claim 8, wherein the conductive trace is at least partially surrounded by (i) a dielectric material and (ii) a conductive layer such that electromagnetic interference is reduced when an alternating current signal is being transmitted between the at least two electrical components.

12. The computing device of claim 8, the at least two electrical components include at least one of an audio jack, a motor, an antenna, a camera, a display device, a processor, a button, or a power management unit.

13. The computing device of claim 8, wherein the power terminals are disposed on a side of the battery and the at least two electrical components are connected to the conductive trace on a different side of the battery.

* * * * *